(12) United States Patent
Lavache et al.

(10) Patent No.: US 8,660,815 B2
(45) Date of Patent: Feb. 25, 2014

(54) METHODS AND APPARATUS FOR FILTERING NOISE IN A THREE-DIMENSIONAL POSITION MEASUREMENT SYSTEM

(75) Inventors: Steven Lavache, Ware Hertfordshire (GB); Richard Baxter, Aylesbury (GB)

(73) Assignee: Performance Designed Products LLC, Sherman Oaks, CA (US)

( * ) Notice: Subject to any disclaimer, the term of this patent is extended or adjusted under 35 U.S.C. 154(b) by 891 days.

(21) Appl. No.: 12/822,921

(22) Filed: Jun. 24, 2010

(65) Prior Publication Data

US 2011/0153269 A1    Jun. 23, 2011

Related U.S. Application Data

(63) Continuation of application No. PCT/GB2009/000253, filed on Jan. 30, 2009.

(51) Int. Cl.
*G01B 21/26* (2006.01)
*G01S 5/06* (2006.01)
*G01S 11/00* (2006.01)
*G06F 19/00* (2011.01)
*G06F 17/40* (2006.01)

(52) U.S. Cl.
CPC . *G01B 21/26* (2013.01); *G01S 5/06* (2013.01); *G01S 11/00* (2013.01); *G06F 19/00* (2013.01); *G06F 17/40* (2013.01)
USPC ........ 702/152; 181/125; 250/526; 340/686.6; 342/126; 356/3.13; 356/623; 367/118

(58) Field of Classification Search
CPC ........... G01B 5/00; G01B 5/004; G01B 5/14; G01B 7/00; G01B 7/004; G01B 7/14; G01B 11/00; G01B 11/002; G01B 11/02; G01B 11/03; G01B 11/147; G01B 15/00; G01B 17/00; G01B 21/00; G01B 21/02; G01B 21/04; G01B 21/16; G01C 3/00; G01C 3/10; G01C 3/14; G01C 3/16; G01C 3/18; G01C 3/20; G01C 3/24; G01C 3/26; G01D 7/21; G01D 21/00; G01S 5/00; G01S 5/02; G01S 5/04; G01S 5/06; G01S 5/08; G01S 5/10; G01S 5/14; G01S 5/16; G01S 5/18; G01S 5/20; G01S 2/24; G01S 5/26; G01S 5/30; G01S 11/00; G01S 11/02; G01S 11/12; G01S 11/14; G01S 19/00; G01S 19/01; G01S 19/38; G01S 19/39; G01S 19/42; G01S 19/43; G01S 2205/00; G06F 11/00; G06F 11/30; G06F 11/32; G06F 17/00; G06F 17/40; G06F 19/00
USPC ........... 73/149, 432.1, 865.8, 966.3; 181/125; 250/526; 340/500, 540, 686.1, 686.6; 342/118, 126; 365/3, 3.13, 3.14, 614, 365/623; 367/117, 118, 127, 129, 907; 701/1, 400, 408, 492; 702/1, 127, 150, 702/152, 155, 158, 187, 189; 708/100, 105, 708/200
IPC ................ G01B 5/00, 5/004, 5/14, 7/00, 7/004, G01B 7/14, 11/00, 11/002, 11/02, 11/03, G01B 11/14, 15/00, 17/00, 21/00, 21/02, G01B 21/04, 21/16; G01C 3/00, 3/10, 3/12, G01C 3/14, 3/16, 3/18, 3/20, 3/24, 3/26; G01D 7/00, 21/00; G01S 5/00, 5/02, 5/04, 5/06, G01S 5/08, 5/10, 5/14, 5/16, 5/18, 5/20, 5/24, G01S 5/26, 5/30, 11/00, 11/02, 11/12, 11/14, G01S 19/00, 19/01, 19/38, 19/39, 19/42, G01S 19/43, 2205/00; G06F 11/00, 11/30, G06F 11/32, 17/00, 17/40, 19/00
See application file for complete search history.

(56) References Cited

U.S. PATENT DOCUMENTS

| | | | |
|---|---|---|---|
| 2,913,720 A * | 11/1959 | Zabb et al. | 342/451 |
| 2,993,203 A * | 7/1961 | Hulst | 342/387 |
| 5,280,457 A * | 1/1994 | Figueroa et al. | 367/127 |
| 6,150,979 A * | 11/2000 | Tsui | 342/357.61 |
| 2003/0128161 A1 | 7/2003 | Oh et al. | |

FOREIGN PATENT DOCUMENTS

| | | |
|---|---|---|
| EP | 0420500 A2 * | 4/1991 |
| EP | 1521096 A2 * | 5/2005 |
| GB | A-2 259 364 | 3/1993 |
| GB | 2320089 A * | 6/1998 |
| GB | 2457030 A * | 8/2009 |
| WO | WO 2007/110626 * | 10/2007 |
| WO | WO 2009/095674 A1 * | 8/2009 |

OTHER PUBLICATIONS

International Preliminary Report on Patentability for International App. No. PCT/GB2009/000253, completed Aug. 3, 2010.

* cited by examiner

*Primary Examiner* — Edward Cosimano

(74) *Attorney, Agent, or Firm* — Sheppard Mullin Richter & Hampton LLP

(57) ABSTRACT

A method of filtering noise in a three-dimensional position measurement system comprising receiving distance data representative of the respective distances between at least four spatially dispersed known points and an unknown point, performing triangulation calculations to determine at least two solutions to the three dimensional position of the unknown point relative to the known points, calculating a symmetrical bounding surface such as a sphere or cube which just encloses the said solutions, comparing the maximum dimension of the bounding surface with a first predetermined error threshold, and if the maximum dimension is less than the first error threshold, determining the center position of the bounding surface and outputting the center position as a noise-filtered position for the unknown point.

48 Claims, 2 Drawing Sheets

METHODS AND APPARATUS FOR FILTERING NOISE IN A THREE-DIMENSIONAL POSITION MEASUREMENT SYSTEM

CROSS-REFERENCE TO RELATED APPLICATIONS

This application is a continuation of and claims the benefit of Patent Cooperation Treaty Application No. PCT/GB2009/000253 filed on Jan. 30, 2009, which claims the priority of British Patent Application No. 0801641.2 filed on Jan. 30, 2008, both of which are hereby incorporated herein by reference in their entirety.

FIELD OF THE INVENTION

The present invention relates to methods and apparatuses for filtering or cancelling noise present in data received from three-dimensional position measurement apparatus.

DESCRIPTION OF THE RELATED ART

The present invention relates to methods and apparatuses for filtering or cancelling noise present in data received from three-dimensional position measurement apparatus, such as that disclosed in co-pending PCT patent application publication WO 2007/110626, the disclosure of which is hereby incorporated by reference.

Our earlier application discloses apparatus in which one or more movable components such as hand-held game controllers are operable to transmit an ultrasonic pulse starting at a known time. The pulse is received by three or more ultrasonic transducers which are arranged in a known spatial relationship and are spaced apart. The pulse of ultrasonic energy transmitted by the mobile component therefore travels different distances to the spaced apart transducers. The distance may be determined by measuring the time of flight of the ultrasonic pulse from the mobile component to the fixed component on the assumption that the speed of propagation of the pulse is substantially constant for the distances concerned.

Performing triangulation using the three or more distance measurements and the known spaced apart relationship of the fixed transducers, it is possible to derive at least one solution for the three-dimensional position of the mobile hand-held component.

Under ideal conditions the derived solution or solutions will all be identical. However in practice, room reflections, extraneous noise and moving objects such as other people obscuring sensors, causes variation in the solutions.

To help overcome this problem, the apparatus proposed in our earlier application uses four fixed sensors which allows four possible solutions since effectively the fourth sensor may be considered redundant since in theory at least three sensors should be enough to determine position in three dimensions.

The provision of four solutions allows ready detection of errors since unless the solutions are identical, it may be assumed that at least one of the solutions is inaccurate. However, the derivation of a correct or corrected solution even with the provision of four or more possible solutions through redundant transducers, is still a complex problem.

BRIEF SUMMARY OF EMBODIMENTS OF THE INVENTION

The present invention relates to methods and apparatuses for filtering or cancelling noise present in data received from three-dimensional position measurement apparatus. More specifically, the present invention is concerned with carrying out processing on the raw output of the transducer triangulation calculations in order to provide a noise filtered result of greater accuracy.

Accordingly, in one embodiment, the invention provides a method of filtering noise in a three-dimensional position measurement system comprising receiving distance data representative of the respective distances between at least four spatially dispersed known points and an unknown point, performing triangulation calculations to determine at least two solutions to the three dimensional position of the unknown point relative to the known points, calculating a symmetrical bounding surface such as a sphere or cube which just encloses the said solutions, comparing the maximum dimension of the bounding surface with a first predetermined error threshold, and if the maximum dimension is less than the first error threshold, determining the centre position of the bounding surface and outputting the centre position as a noise-filtered position for the unknown point.

In another embodiment, the invention provides position detection apparatus arranged to receive distance data representative of the respective distances between at least four spatially dispersed known points and an unknown point, to carry out the processing steps of any preceding claim and to output data representative of a noise-filtered position for the unknown point.

BRIEF DESCRIPTION OF THE DRAWINGS

The present invention, in accordance with one or more various embodiments, is described by way of example with reference to the following figures.

DETAILED DESCRIPTION OF THE EMBODIMENTS OF THE INVENTION

The invention will now be described by way of example with reference to the drawings.

Figure 1:
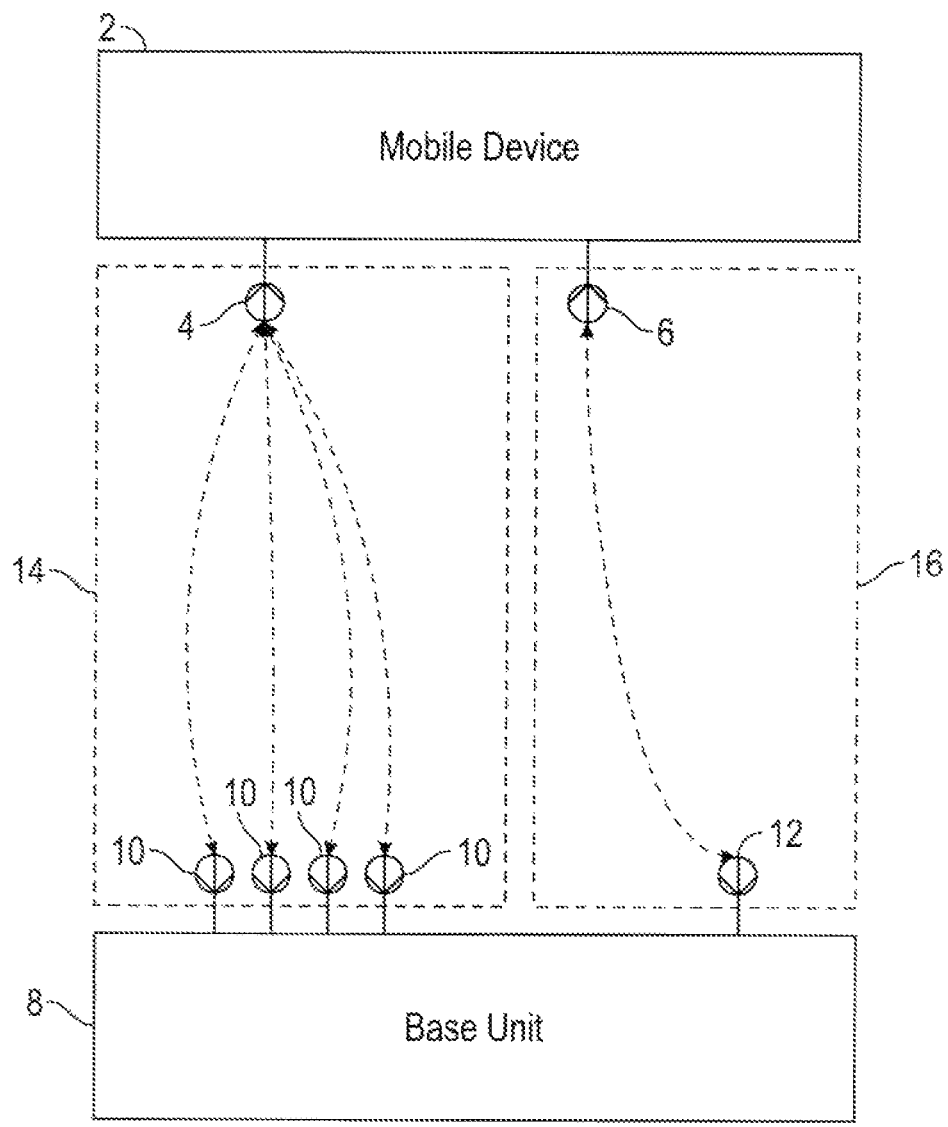
FIG. 1 is a block diagram of an example of the type of apparatus which may be used with the present invention.

With reference to FIG. 1, a mobile device 2 has an ultrasonic transducer 4 used in ultrasonic channel 14 and an RF transducer 6 used in RF channel 16.

A fixed base unit 8 has four ultrasonic transducers 10 used in ultrasonic channel 14 and an RF transducer 12 used in RF channel 16.

Control communications are transmitted and received using the RF transducers 6 and 12 and in operation, the base unit 8 commands for the mobile unit 2 to transmit a burst of ultrasonic energy via the transducer 4.

The base unit 8 then measures the time between issuing the command and receiving ultrasonic energy at each of the transducers 10. Although in the figure, the transducers 10 are shown adjacent one another, in practice these transducers are spatially dispersed by distances of the order of five to fifteen centimeters which then allows differences in time of flight between the transducer 4 and the plurality of transducers 10, to be measured. By assuming a speed of propagation for the ultrasonic energy or by performing a calibration of the type discussed in our early application, the time of flight measurement may be converted into a distance measurement for the distance between the unknown position of the transducer 4 and the known positions of the transducers 10.

Thus, the apparatus in operation produces a set of distances which may be processed using triangulation calculations, to derive a solution for the three-dimensional position of the transducer 4 relative to the transducers 10 and also a further three "redundant" solutions which may be used for error detection and correction as discussed in detail below. It will be appreciated that the addition of further transducers 10 will provide further redundant calculations which may also be used in the techniques described below to provide error detection and correction capability. Equally, some of the techniques described below could be used with only three fixed transducers 10.

Figure 2:
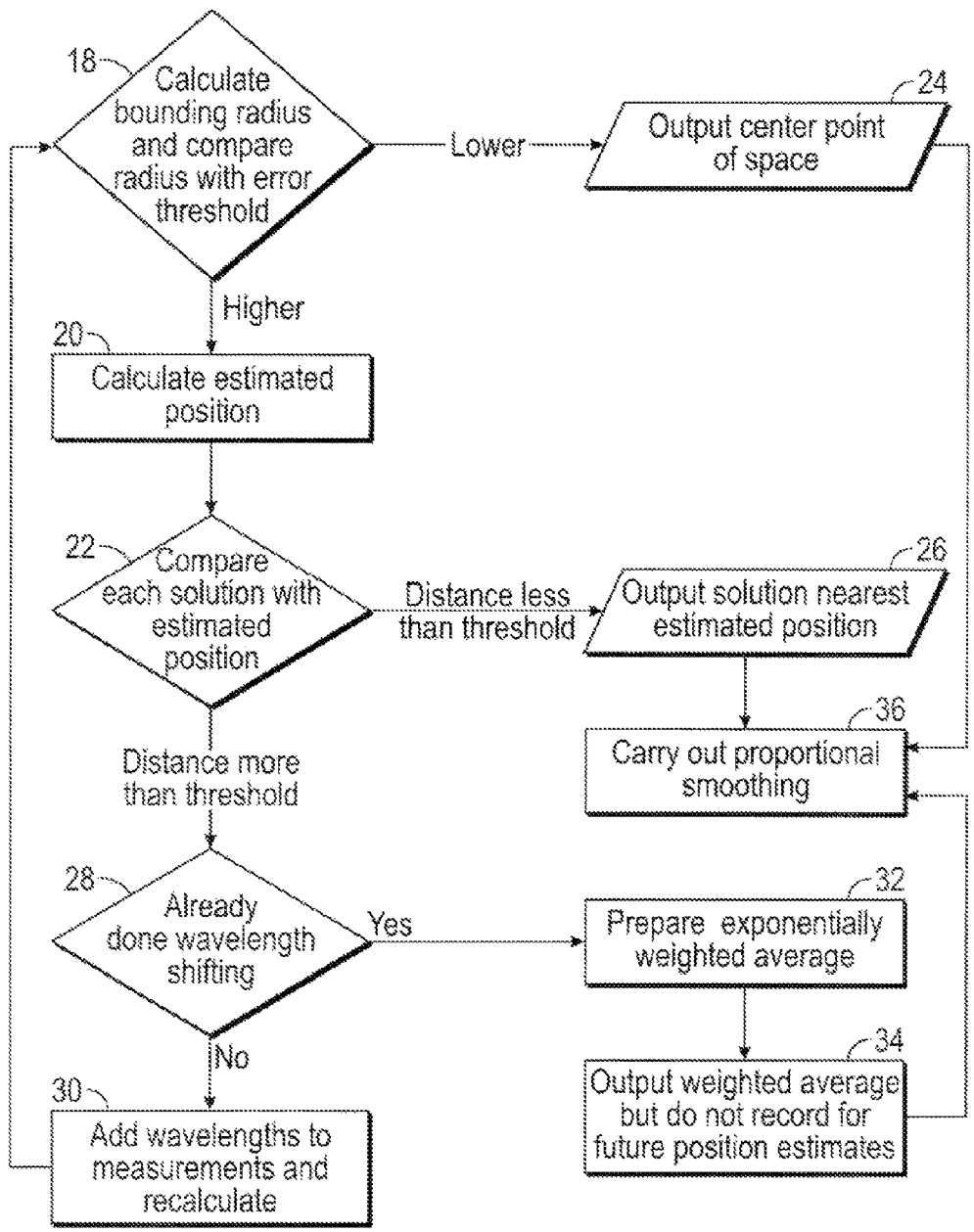
FIG. 2 is a schematic flow chart showing process steps concerned with the present application.

With reference to FIG. 2, in a first step of processing a bounding surface is calculated (step 18) which encompasses the four possible position solutions. In the preferred embodiment, the bounding surface is a sphere. The surface is calculated to enclose the solutions with a minimum radius.

The radius of the bounding sphere is compared with an error threshold at step 18. If the radius is smaller than the threshold then the centre of the sphere is determined and this centre position is returned at step 24 as a valid current position for the transducer 4. The outputted centre position is then smoothed relative to a historical solution at step 36, as discussed below.

It will be appreciated that these conditions will be met when all solutions provide a result close to one another. By taking the centre of the sphere as the final position, a spatial averaging is carried out.

If the points in step 18 do not fit within an appropriately sized bounding space, then the data is further processed. This happens when at least one of the solutions is significantly different to the others and indicates an error in at least one of the solutions. First, an estimate is made of the expected position based on historical velocity and direction interval and the time since the last good reading at step 20. At step 22, the solutions are then compared against the estimate calculated at step 20. If any of the solutions are a distance less than a pre-determined error threshold (which may be the same threshold as that used in step 18) then that solution is considered a viable candidate for output. If more than one solution is within the error threshold then the position nearest to the estimated position is output at step 26 for smoothing at step 36.

If less than one or no solution is less than the threshold (i.e. the distance is more than the threshold), then the distances measured from the apparatus will be further processed to determine if information necessary for a valid measurement has been missed. At step 28, the system determines if the solutions had previously been adjusted through wavelength shifting. If the determination at step 28 is "NO," then the solutions are systematically adjusted and the same steps carried out again. The adjustment is made on the assumption that a complete cycle wavelength of the ultrasonic energy may have been missed. Thus, the distance measurements are processed by sequentially adding distances equivalent to multiples of the wavelength of the ultrasonic energy at step 30. For example, solutions may be sought adding one, two, and/or three wavelengths to each of the distance measurements in turn. The possibility of adding wavelengths to all four at the same time is excluded since this would not yield a valid result.

In this way, the system is able to hypothesize which of the measurements may be in error through missing the beginning of receipt of ultrasonic energy by the transducers 10. If having carried out the systematic processing, the solutions are closer together (step 18) or are close to the estimated position (step 22) then it is reasonable to assume that a valid position measurement may be output (step 24 or 26) and processing may then cease.

However, if none of the solutions have passed the test at steps 18 and 22 even with the wavelength shifting of step 30, a weighted average is instead prepared. If the determination at step 28 is "YES" (indicating that the adjustment has already been applied to the solutions) then the weighted average is prepared. The average is prepared at step 32 using a weighting (preferably exponential) based on the distance of each solution from the estimated position calculated in step 20. Positions which are furthest from the estimated position based on previous good data are therefore given less weighting. For solutions close to the estimated position the output is approximately an average. This has the effect of preventing a single large scale erroneous solution from having a significant effect on the calculated position. However, this weighted average is not used for future position estimations in future iterations of step 20. This weighted average is outputted at step 34, but the weighted average is not retained because it is not used in future estimations.

The preferred weighting is simply the reciprocal of the distance from the estimated position.

Preferably all solutions outputted at steps 24, 26, and/or 34 are smoothed relative to the historical solution at step 36. This may for example be carried out by taking a proportionally weighted average of the present output position and the previous cumulative position. This may be achieved, for example, by calculating the distance between the present value and the previous value and, for example, adding on a value weighted by (one minus two times the distance).

Thus for every updated position, that value is used to update an ever-present smoothed value of position. This ever-present value is updated to be a weighted average of itself, and the new position value. The weighting is from 0 to 1, and is chosen to guarantee 0% of the existing value (and thus 100% of the new) when a 'large' movement has occurred, current implementation takes 'large' as 50 cm. And 100% of the existing value (0% of the new) when the new position value is the same as the ever-present value. The large the proportion of the existing value, the more highly smoothed the value is, which we can tolerate at small displacements, but not at large ones because the lag becomes too evident. We linearly interpolate this weighting for every difference between. Hence weighting=1−2*dist gives a 0 or 0% weighting of the existing, and 1 or 100% weighting of the new, when the dist=0.5 m or 50 cm.

This weighting allows jitter to be smoothed when movement from the last position is very small but also allows the process to react quickly if genuine large movements have been made.

What is claimed is:

1. A method of filtering noise in a three-dimensional position measurement system comprising:
   (a) receiving distance data representative of the respective distances between at least four spatially dispersed known points and an unknown point;
   (b) performing triangulation calculations to determine at least two solutions to the three dimensional position of the unknown point relative to the known points;
   (c) calculating a symmetrical bounding surface such as a sphere or cube which just encloses the said solutions;
   (d) comparing the maximum dimension of the bounding surface with a first predetermined error threshold; and
   (e) if the maximum dimension is less than the first error threshold, determining the centre position of the bounding surface and outputting the centre position as a noise-filtered position for the unknown point.

2. A method according to claim 1, wherein an averaged noise-filtered position or the said noise-filtered position is averaged with a cumulative historical position value by weighted addition to the cumulative historical position value wherein the weighting is proportional to the distance between the cumulative historical position value and the averaged noise-filtered position or the said noise-filtered position.

3. A method according to claim 1, wherein the distance data is derived from measurements of time related to propagation of sound between the known points and the unknown point and wherein adjusted distance measurements are calculated by adding different combinations of a distance equal to one or more wavelength of the said sound and wherein the said solutions are recalculated using the adjusted distance data to derive a plurality of adjusted position measurements, and wherein the method further comprises carrying out the steps (a)-(e) on the adjusted position measurements.

4. A method according to claim 3, wherein an averaged noise-filtered position or the said noise-filtered position is averaged with a cumulative historical position value by weighted addition to the cumulative historical position value wherein the weighting is proportional to the distance between the cumulative historical position value and the averaged noise-filtered position or the said noise-filtered position.

5. A method according to claim 3, wherein an averaged noise-filtered position is calculated using a weighted average of the said solutions wherein the solutions are exponentially weighted according to their vector distance from the estimated position with solutions further from the estimated position being weighted less than nearer solutions.

6. A method according to claim 5, wherein the averaged noise-filtered position or the said noise-filtered position is averaged with a cumulative historical position value by weighted addition to the cumulative historical position value wherein the weighting is proportional to the distance between the cumulative historical position value and the averaged noise-filtered position or the said noise-filtered position.

7. A method according to claim 1, wherein an estimated position for the unknown point is calculated based on historical noise-filtered position data, wherein the said solutions are compared with the estimated position and wherein the said solution which is closest to the estimated position and which is less than a second predetermined error threshold from the estimated position, is output as the noise-filtered position for the unknown point.

8. A method according to claim 7, wherein an averaged noise-filtered position or the said noise-filtered position is averaged with a cumulative historical position value by weighted addition to the cumulative historical position value wherein the weighting is proportional to the distance between the cumulative historical position value and the averaged noise-filtered position or the said noise-filtered position.

9. A method according to claim 7, wherein an averaged noise-filtered position is calculated using a weighted average of the said solutions wherein the solutions are exponentially weighted according to their vector distance from the estimated position with solutions further from the estimated position being weighted less than nearer solutions.

10. A method according to claim 9, wherein the averaged noise-filtered position or the said noise-filtered position is averaged with a cumulative historical position value by weighted addition to the cumulative historical position value wherein the weighting is proportional to the distance between the cumulative historical position value and the averaged noise-filtered position or the said noise-filtered position.

11. A method according to claim 7, wherein the distance data is derived from measurements of time related to propagation of sound between the known points and the unknown point and wherein adjusted distance measurements are calculated by adding different combinations of a distance equal to one or more wavelength of the said sound and wherein the said solutions are recalculated using the adjusted distance data to derive a plurality of adjusted position measurements, and wherein the method further comprises carrying out the steps (a)-(e) on the adjusted position measurements.

12. A method according to claim 11, wherein an averaged noise-filtered position or the said noise-filtered position is averaged with a cumulative historical position value by weighted addition to the cumulative historical position value wherein the weighting is proportional to the distance between the cumulative historical position value and the averaged noise-filtered position or the said noise-filtered position.

13. A method according to claim 11, wherein an averaged noise-filtered position is calculated using a weighted average of the said solutions wherein the solutions are exponentially weighted according to their vector distance from the estimated position with solutions further from the estimated position being weighted less than nearer solutions.

14. A method according to claim 13, wherein the averaged noise-filtered position or the said noise-filtered position is averaged with a cumulative historical position value by weighted addition to the cumulative historical position value wherein the weighting is proportional to the distance between the cumulative historical position value and the averaged noise-filtered position or the said noise-filtered position.

15. A method according to claim 11, wherein an averaged noise-filtered position is ignored when calculating further estimated positions.

16. A method according to claim 15, wherein the averaged noise-filtered position or the said noise-filtered position is averaged with a cumulative historical position value by weighted addition to the cumulative historical position value wherein the weighting is proportional to the distance between the cumulative historical position value and the averaged noise-filtered position or the said noise-filtered position.

17. A method according to claim 7, wherein the first and second error thresholds have the same value.

18. A method according to claim 17, wherein an averaged noise-filtered position or the said noise-filtered position is averaged with a cumulative historical position value by weighted addition to the cumulative historical position value wherein the weighting is proportional to the distance between the cumulative historical position value and the averaged noise-filtered position or the said noise-filtered position.

19. A method according to claim 17, wherein an averaged noise-filtered position is calculated using a weighted average of the said solutions wherein the solutions are exponentially weighted according to their vector distance from the estimated position with solutions further from the estimated position being weighted less than nearer solutions.

20. A method according to claim 19, wherein the averaged noise-filtered position or the said noise-filtered position is averaged with a cumulative historical position value by weighted addition to the cumulative historical position value wherein the weighting is proportional to the distance between the cumulative historical position value and the averaged noise-filtered position or the said noise-filtered position.

21. A method according to claim 17, wherein the distance data is derived from measurements of time related to propagation of sound between the known points and the unknown point and wherein adjusted distance measurements are calculated by adding different combinations of a distance equal to one or more wavelength of the said sound and wherein the said solutions are recalculated using the adjusted distance data to derive a plurality of adjusted position measurements, and wherein the method further comprises carrying out the steps (a)-(e) on the adjusted position measurements.

22. A method according to claim 21, wherein an averaged noise-filtered position or the said noise-filtered position is averaged with a cumulative historical position value by weighted addition to the cumulative historical position value wherein the weighting is proportional to the distance between the cumulative historical position value and the averaged noise-filtered position or the said noise-filtered position.

23. A method according to claim 21, wherein an averaged noise-filtered position is calculated using a weighted average of the said solutions wherein the solutions are exponentially weighted according to their vector distance from the estimated position with solutions further from the estimated position being weighted less than nearer solutions.

24. A method according to claim 23, wherein the averaged noise-filtered position or the said noise-filtered position is averaged with a cumulative historical position value by weighted addition to the cumulative historical position value wherein the weighting is proportional to the distance between the cumulative historical position value and the averaged noise-filtered position or the said noise-filtered position.

25. A position detection apparatus arranged to receive distance data representative of the respective distances between at least four spatially dispersed known points and an unknown point, to carry out the processing steps of:
  (a) receiving distance data representative of the respective distances between at least four spatially dispersed known points and an unknown point;
  (b) performing triangulation calculations to determine at least two solutions to the three dimensional position of the unknown point relative to the known points;
  (c) calculating a symmetrical bounding surface such as a sphere or cube which just encloses the said solutions;
  (d) comparing the maximum dimension of the bounding surface with a first predetermined error threshold; and
  (e) if the maximum dimension is less than the first error threshold, determining the centre position of the bounding surface and outputting the centre position as a noise-filtered position for the unknown point;
and to output data representative of a noise-filtered position for the unknown point.

26. A position detection apparatus according to claim 25, wherein an averaged noise-filtered position or the said noise-filtered position is averaged with a cumulative historical position value by weighted addition to the cumulative historical position value wherein the weighting is proportional to the distance between the cumulative historical position value and the averaged noise-filtered position or the said noise-filtered position.

27. A position detection apparatus according to claim 25, wherein the distance data is derived from measurements of time related to propagation of sound between the known points and the unknown point and wherein adjusted distance measurements are calculated by adding different combinations of a distance equal to one or more wavelength of the said sound and wherein the said solutions are recalculated using the adjusted distance data to derive a plurality of adjusted position measurements, and wherein the method further comprises carrying out the steps (a)-(e) on the adjusted position measurements.

28. A position detection apparatus according to claim 27, wherein an averaged noise-filtered position or the said noise-filtered position is averaged with a cumulative historical position value by weighted addition to the cumulative historical position value wherein the weighting is proportional to the distance between the cumulative historical position value and the averaged noise-filtered position or the said noise-filtered position.

29. A position detection apparatus according to claim 27, wherein an averaged noise-filtered position is calculated using a weighted average of the said solutions wherein the solutions are exponentially weighted according to their vector distance from the estimated position with solutions further from the estimated position being weighted less than nearer solutions.

30. A position detection apparatus according to claim 29, wherein the averaged noise-filtered position or the said noise-filtered position is averaged with a cumulative historical position value by weighted addition to the cumulative historical position value wherein the weighting is proportional to the distance between the cumulative historical position value and the averaged noise-filtered position or the said noise-filtered position.

31. A position detection apparatus according to claim 25, wherein an estimated position for the unknown point is calculated based on historical noise-filtered position data, wherein the said solutions are compared with the estimated position and wherein the said solution which is closest to the estimated position and which is less than a second predetermined error threshold from the estimated position, is output as the noise-filtered position for the unknown point.

32. A position detection apparatus according to claim 31, wherein an averaged noise-filtered position or the said noise-filtered position is averaged with a cumulative historical position value by weighted addition to the cumulative historical position value wherein the weighting is proportional to the distance between the cumulative historical position value and the averaged noise-filtered position or the said noise-filtered position.

33. A position detection apparatus according to claim 31, wherein an averaged noise-filtered position is calculated using a weighted average of the said solutions wherein the solutions are exponentially weighted according to their vector distance from the estimated position with solutions further from the estimated position being weighted less than nearer solutions.

34. A position detection apparatus according to claim 33, wherein the averaged noise-filtered position or the said noise-filtered position is averaged with a cumulative historical position value by weighted addition to the cumulative historical position value wherein the weighting is proportional to the distance between the cumulative historical position value and the averaged noise-filtered position or the said noise-filtered position.

35. A position detection apparatus according to claim 31, wherein the distance data is derived from measurements of time related to propagation of sound between the known points and the unknown point and wherein adjusted distance measurements are calculated by adding different combinations of a distance equal to one or more wavelength of the said sound and wherein the said solutions are recalculated using the adjusted distance data to derive a plurality of adjusted position measurements, and wherein the method further comprises carrying out the steps (a)-(e) on the adjusted position measurements.

36. A position detection apparatus according to claim 35, wherein an averaged noise-filtered position or the said noise-filtered position is averaged with a cumulative historical position value by weighted addition to the cumulative historical position value wherein the weighting is proportional to the distance between the cumulative historical position value and the averaged noise-filtered position or the said noise-filtered position.

37. A position detection apparatus according to claim 35, wherein an averaged noise-filtered position is calculated using a weighted average of the said solutions wherein the solutions are exponentially weighted according to their vector distance from the estimated position with solutions further from the estimated position being weighted less than nearer solutions.

38. A position detection apparatus according to claim 37, wherein the averaged noise-filtered position or the said noise-filtered position is averaged with a cumulative historical position value by weighted addition to the cumulative historical position value wherein the weighting is proportional to the distance between the cumulative historical position value and the averaged noise-filtered position or the said noise-filtered position.

39. A position detection apparatus according to claim 35, wherein an averaged noise-filtered position is ignored when calculating further estimated positions.

40. A position detection apparatus according to claim 39, wherein the averaged noise-filtered position or the said noise-filtered position is averaged with a cumulative historical position value by weighted addition to the cumulative historical position value wherein the weighting is proportional to the distance between the cumulative historical position value and the averaged noise-filtered position or the said noise-filtered position.

41. A position detection apparatus according to claim 31, wherein the first and second error thresholds have the same value.

42. A position detection apparatus according to claim 41, wherein an averaged noise-filtered position or the said noise-filtered position is averaged with a cumulative historical position value by weighted addition to the cumulative historical position value wherein the weighting is proportional to the distance between the cumulative historical position value and the averaged noise-filtered position or the said noise-filtered position.

43. A position detection apparatus according to claim 41, wherein an averaged noise-filtered position is calculated using a weighted average of the said solutions wherein the solutions are exponentially weighted according to their vector distance from the estimated position with solutions further from the estimated position being weighted less than nearer solutions.

44. A position detection apparatus according to claim 43, wherein the averaged noise-filtered position or the said noise-filtered position is averaged with a cumulative historical position value by weighted addition to the cumulative historical position value wherein the weighting is proportional to the distance between the cumulative historical position value and the averaged noise-filtered position or the said noise-filtered position.

45. A position detection apparatus according to claim 41, wherein the distance data is derived from measurements of time related to propagation of sound between the known points and the unknown point and wherein adjusted distance measurements are calculated by adding different combinations of a distance equal to one or more wavelength of the said sound and wherein the said solutions are recalculated using the adjusted distance data to derive a plurality of adjusted position measurements, and wherein the method further comprises carrying out the steps (a)-(e) on the adjusted position measurements.

46. A position detection apparatus according to claim 45, wherein an averaged noise-filtered position or the said noise-filtered position is averaged with a cumulative historical position value by weighted addition to the cumulative historical position value wherein the weighting is proportional to the distance between the cumulative historical position value and the averaged noise-filtered position or the said noise-filtered position.

47. A position detection apparatus according to claim 45, wherein an averaged noise-filtered position is calculated using a weighted average of the said solutions wherein the solutions are exponentially weighted according to their vector distance from the estimated position with solutions further from the estimated position being weighted less than nearer solutions.

48. A position detection apparatus according to claim 47, wherein the averaged noise-filtered position or the said noise-filtered position is averaged with a cumulative historical position value by weighted addition to the cumulative historical position value wherein the weighting is proportional to the distance between the cumulative historical position value and the averaged noise-filtered position or the said noise-filtered position.

* * * * *